United States Patent
Aoki

(10) Patent No.: US 11,089,554 B2
(45) Date of Patent: Aug. 10, 2021

(54) APPARATUS AND METHOD FOR CONTROLLING UPLINK TRANSMISSION POWER IN WIRELESS COMMUNICATION SYSTEM

(71) Applicant: SAMSUNG ELECTRONICS CO., LTD., Suwon-si (KR)

(72) Inventor: Yuichi Aoki, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/757,009

(22) PCT Filed: May 14, 2018

(86) PCT No.: PCT/KR2018/005472
§ 371 (c)(1),
(2) Date: Apr. 17, 2020

(87) PCT Pub. No.: WO2019/078436
PCT Pub. Date: Apr. 25, 2019

(65) Prior Publication Data
US 2020/0344697 A1    Oct. 29, 2020

(30) Foreign Application Priority Data
Oct. 17, 2017 (KR) .......................... 10-2017-0134371

(51) Int. Cl.
*H04W 52/14* (2009.01)
*H04W 52/24* (2009.01)
*H04W 52/42* (2009.01)

(52) U.S. Cl.
CPC ....... *H04W 52/146* (2013.01); *H04W 52/242* (2013.01); *H04W 52/42* (2013.01)

(58) Field of Classification Search
CPC .. H04B 7/0404; H04W 52/14; H04W 52/146; H04W 52/242
(Continued)

(56) References Cited

U.S. PATENT DOCUMENTS

| 6,847,628 B1 * | 1/2005 | Sakuma | ............... H04B 7/0602 370/347 |
| 7,929,995 B2 * | 4/2011 | Cheng | .................. H04W 16/26 455/562.1 |

(Continued)

FOREIGN PATENT DOCUMENTS

| JP | H04-253402 | 9/1992 |
| JP | 6053305 | 12/2016 |

(Continued)

OTHER PUBLICATIONS

International Search Report for PCT/KR2018/005472 dated Aug. 28, 2018, 5 pages.
(Continued)

*Primary Examiner* — John J Lee
(74) *Attorney, Agent, or Firm* — Nixon & Vanderhye, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for operating a terminal in a wireless communication system may comprise the steps of: receiving a first signal by using a first number of antennas during a first downlink interval; receiving a second signal by using a second number of antennas during a second downlink interval; and transmitting a third signal by using the second number of antennas during an uplink interval, with output power compensated on the basis of the first signal and the second signal.

12 Claims, 14 Drawing Sheets

(58) Field of Classification Search
USPC ......... 455/522, 67.11, 69, 66.1, 277.1, 276.1
See application file for complete search history.

(56) References Cited

U.S. PATENT DOCUMENTS

| | | |
|---|---|---|
| 2006/0270434 A1 | 11/2006 | Iacono |
| 2013/0012255 A1* | 1/2013 | Kim ..................... H04W 52/42 |
| | | 455/522 |
| 2015/0094076 A1 | 4/2015 | Inoue et al. |
| 2016/0192297 A1 | 6/2016 | Kim et al. |
| 2018/0248581 A1* | 8/2018 | Chae ..................... H04W 8/22 |
| 2018/0254814 A1 | 9/2018 | Park et al. |

FOREIGN PATENT DOCUMENTS

| | | |
|---|---|---|
| KR | 10-2015-0054651 | 5/2015 |
| WO | 2011/102666 | 8/2011 |
| WO | 2017/048048 | 3/2017 |
| WO | 2017/082650 | 5/2017 |

OTHER PUBLICATIONS

Written Opinion of the ISA for PCT/KR2018/005472 dated Aug. 28, 2018, 6 pages.
Search Report and Written Opinion dated Oct. 13, 2020 in counterpart European Patent Application No. EP18867485.7.
Communication pursuant to Article 94(3) EPC dated Apr. 30, 2021 in counterpart European Patent Application No. 18867485.7.

* cited by examiner

APPARATUS AND METHOD FOR CONTROLLING UPLINK TRANSMISSION POWER IN WIRELESS COMMUNICATION SYSTEM

This application is the U.S. national phase of International Application No. PCT/KR2018/005472 filed May 14, 2018 which designated the U.S. and claims priority to Korean Patent Application No. 10-2017-0134371 filed Oct. 17, 2017, the entire contents of each of which are hereby incorporated by reference.

TECHNICAL FIELD

The disclosure relates to a wireless communication system and, more particularly, to a method and an apparatus for controlling uplink transmission power in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In various wireless communication systems including a 5G system, the power of an uplink signal may be controlled. Uplink power control may be performed by taking into consideration various aspects such as quality of communication, interference, constraints defined in a standard, and the like. For example, in the case of an LTE system, an allowable variation in uplink transmission power is restricted. Therefore, uplink transmission power needs to be controlled appropriately in a given condition.

SUMMARY

Therefore, the disclosure has been made in view of the above-mentioned problems, and an aspect of the disclosure is to provide a method and apparatus for effectively controlling uplink transmission power in a wireless communication system.

Another aspect of the disclosure is to provide a method and apparatus for estimating an antenna gain when the number of activated transmission antennas is changed in a wireless communication system.

Another aspect of the disclosure is to provide a method and apparatus for estimating, using a downlink signal, an antenna gain when the number of activated transmission antennas is changed in a wireless communication system.

Another aspect of the disclosure is to provide a method and apparatus for performing compensation associated with an antenna gain when the number of activated transmission antennas is changed in a wireless communication system.

In accordance with an aspect of the disclosure, an operation method of a terminal in a wireless communication system may include: receiving a first signal using a first number of antennas during a first downlink interval; receiving a second signal using a second number of antennas during a second downlink interval; and transmitting a third signal using the second number of antennas during an uplink interval, at output power which is compensated based on the first signal and the second signal.

In accordance with another aspect of the disclosure, a terminal apparatus in a wireless communication system may include: a transceiver configured to transmit and receive a signal; at least one processor configured to control the transceiver so as to: receive a first signal using a first number of antennas during a first downlink interval; receive a second signal using a second number of antennas during a second downlink interval; and transmit a third signal using the second number of antennas during an uplink interval, at output power compensated based on the first signal and the second signal.

A method and apparatus according to various embodiments can effectively control uplink transmission power by taking into consideration a variation in antenna gain caused by a change in the number of activated antennas.

Effects obtainable from the disclosure may not be limited to the above mentioned effects, and other effects which are not mentioned may be clearly understood, through the following descriptions, by those skilled in the art to which the disclosure pertains.

DETAILED DESCRIPTION OF EXAMPLE EMBODIMENTS

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to a method and an apparatus for controlling transmission power in a wireless communication system. Particularly, the disclosure provides a description of a technology for controlling transmission power when the number of transmission antennas is changed in a wireless communication system.

In the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

Further, in the following description, the disclosure uses terms and names defined in specific standards (3rd generation partnership project (3GPP)) for the convenience of description. However, they are used merely by way of illustration. Various embodiments of the disclosure may be easily modified and applied to other communication systems.

Figure 1:
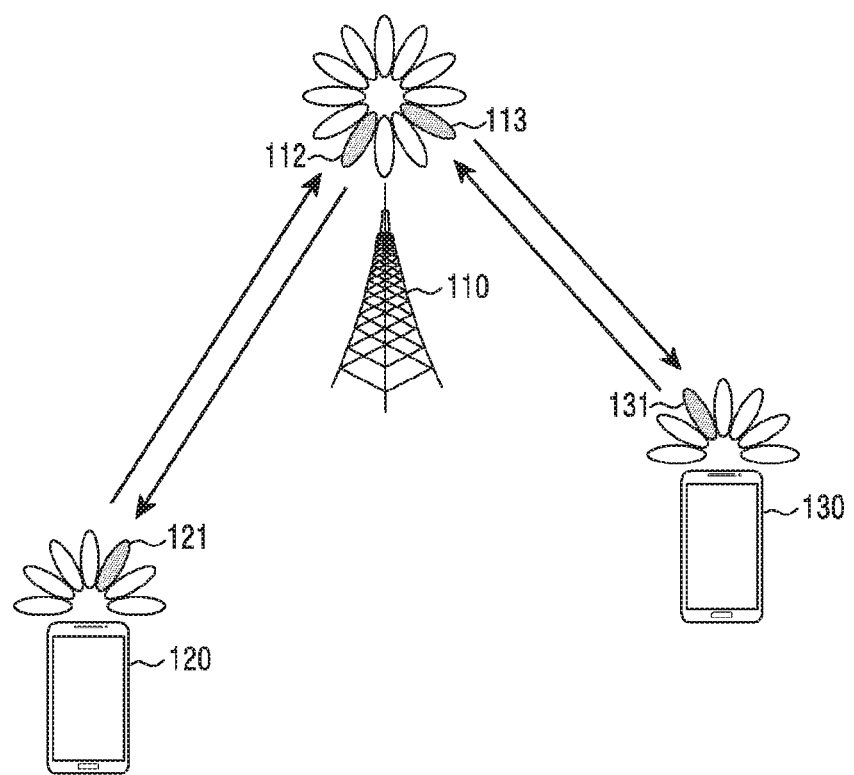
FIG. 1 is a diagram illustrating a wireless communication system according to various embodiments of the disclosure.

FIG. 1 is a diagram illustrating a wireless communication system according to various embodiments of the disclosure. FIG. 1 illustrates a base station 110, a terminal 120, and a terminal 130, as some of the nodes that use wireless channels in a wireless communication system. Although FIG. 1 illustrates a single base station, another base station which is the same as or similar to the base station 110 may be further included.

The base station 110 may be a network infrastructure that provides radio access to terminals 120 and 130. The base station 110 may have coverage defined by a predetermined geographical area based on a distance to which the base station 110 is capable of transmitting a signal. The base station 110 may be referred to as an access point (AP), an eNodeB (eNB), a 5th generation node (5G node), a wireless point, a transmission/reception point (TRP), or other terms having the technical meaning equivalent thereto, in addition to a base station.

Each of the terminals 120 and 130 may be a device used by a user, and may communicate with the base station 110 via a wireless channel. Depending on the case, at least one of the terminals 120 and 130 may operate without operation by a user. That is, at least one of the terminals 120 and 130 is a device that performs machine type communication (MTC), and may not be carried by a user. Alternatively, the terminal 120 and the terminal 130 are stationary devices, and may not have mobility. Each of the terminals 120 and 130 may be referred to as a user equipment (UE), a mobile station, a subscriber station, a remote terminal, a wireless terminal, a consumer premises equipment (CPE), a user device, or other terms having meanings equivalent thereto, in addition to a terminal.

The base station 110, the terminal 120, and the terminal 130 may transmit and receive a wireless signal in a millimeter wave (mmWave) band (e.g., 28 GHz, 30 GHz, 38 GHz, and 60 GHz). In this instance, in order to improve a channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 via a beam search or beam management procedure. After the serving beams 112, 113, 121, and 131 are selected, communication may be performed via resources which are in a quasi co located (QCL) relationship with resources used for transmitting the serving beams 112, 113, 121, and 131.

If large-scale characteristics of a channel that delivers a symbol on a first antenna port can be inferred from a channel that delivers a symbol on a second antenna port, it is estimated that the first antenna port and the second antenna port are in the QCL relationship. For example, the large-scale characteristics may include at least one of a delay spread, a Doppler spread, a Doppler shift, an average gain, an average delay, and a spatial receiver parameter.

Figure 2:
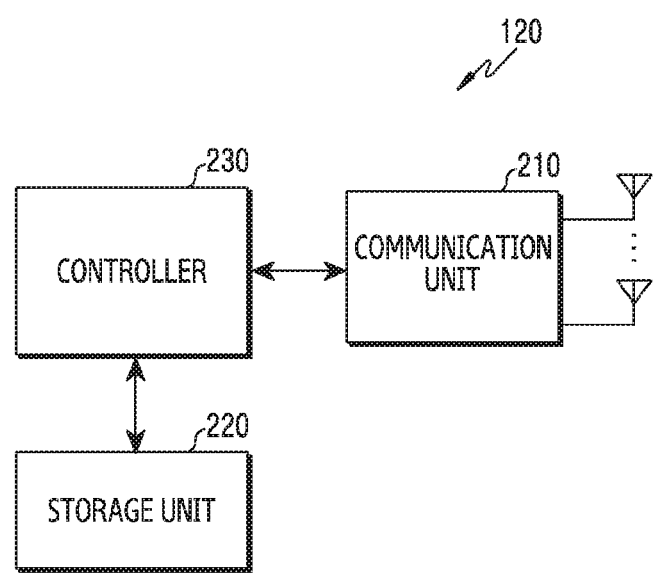
FIG. 2 is a block diagram illustrating the configuration of a terminal in a wireless communication system according to various embodiments of the disclosure.

FIG. 2 is a block diagram illustrating the configuration of a terminal in a wireless communication system according to various embodiments of the disclosure. The configuration of FIG. 2 may be understood as the configuration of the terminal 120. The ending "unit" or "er" used hereinafter may refer to a unit for processing at least one function or operation and may be implemented as hardware, software, or a combination of hardware and software.

Referring to FIG. 2, the terminal includes a communication unit 210, a storage unit 220, and a controller 230.

The communication unit 210 performs functions of transmitting or receiving a signal via a wireless channel. For example, the communication unit 210 performs a function of conversion between a baseband signal and a bit stream according to the physical layer standard of a system. For example, in the case of data transmission, the communication unit 210 generates complex symbols by encoding and modulating a transmission bit stream. Also, in the case of data reception, the communication unit 210 restores a reception bit stream by demodulating and decoding a baseband signal. Also, the communication unit 210 up-converts a baseband signal into a radio-frequency (RF) band signal and transmits the same via an antenna, and down-converts an RF band signal received via an antenna into a baseband signal. For example, the communication unit 210 may include a transmission filter, a reception filter, an amplifier, a mixer, an oscillator, a digital-to-analog convertor (DAC), an analog-to-digital convertor (ADC), and the like.

Also, the communication unit 210 may include a plurality of transmission/reception paths. In addition, the communication unit 210 may include at least one antenna array including a plurality of antenna elements. From the perspective of hardware, the communication unit 210 may include a digital circuit and an analog circuit (e.g., a radio frequency integrated circuit (RFIC)). Here, the digital circuit and the analog circuit may be implemented as a single package. Also, the communication unit 210 may include a plurality of RF chains. In addition, the communication unit 210 may perform beamforming.

The communication unit 210 may transmit or receive a signal as described above. Accordingly, the whole or a part of the communication unit 210 may be referred to as a "transmitter", "receiver", or "transceiver". Also, the transmission and reception performed via a wireless channel disclosed in the following descriptions may be understood as a meaning including the above-described processing performed by the communication unit 210.

The storage unit 220 may store data, such as a basic program, an application program, configuration information, and the like for operating a terminal. The storage unit 220 may be implemented as a volatile memory, a non-volatile memory, or a combination of a volatile memory and a non-volatile memory. In addition, the storage unit 220 may provide data stored therein in response to a request from the controller 230.

The controller 230 may control overall operation of a terminal. For example, the controller 230 may perform signal transmission and reception via the communication unit 210. Further, the controller 230 records data in the storage unit 220 and reads the recorded data. The controller 230 may perform functions of a protocol stack that the communication standard requires. To this end, the controller 230 may include at least one processor or micro-processor, or may be a part of the processor. Also, a part of the communication unit 210 and the controller 230 may be referred to as a communication processor (CP).

According to various embodiments, the controller 230 may receive a first signal using a first number of antennas during a first downlink interval, may receive a second signal using a second number of antennas during a second downlink interval, and may transmit a third signal using the second number of antennas during an uplink interval, at output power compensated based on the first signal and the second signal. For example, the controller 230 may perform control so that the terminal performs operations according to various embodiments.

Figure 3A:
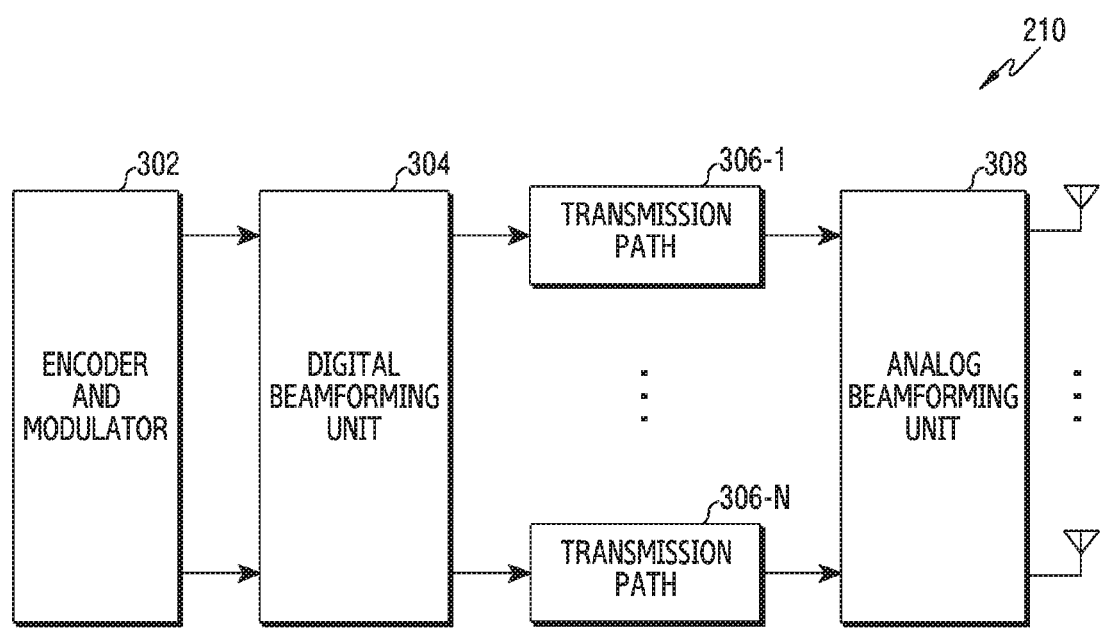
FIGS. 3A, 3B, and 3C are diagrams illustrating the configuration of a communication unit in a wireless communication system according to various embodiments of the disclosure.
Figure 3B:
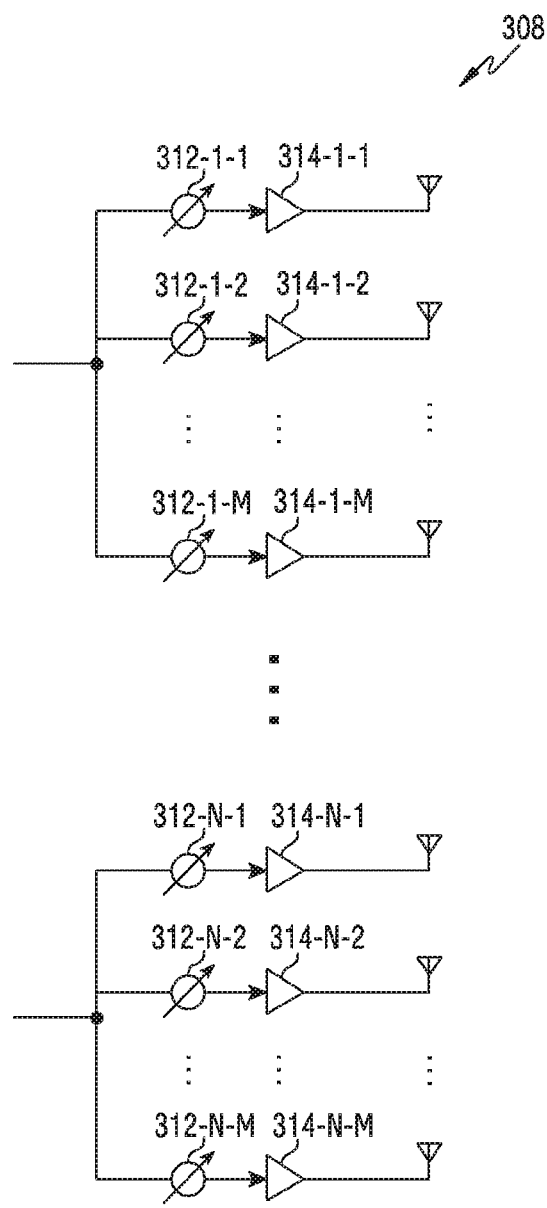
Figure 3C:
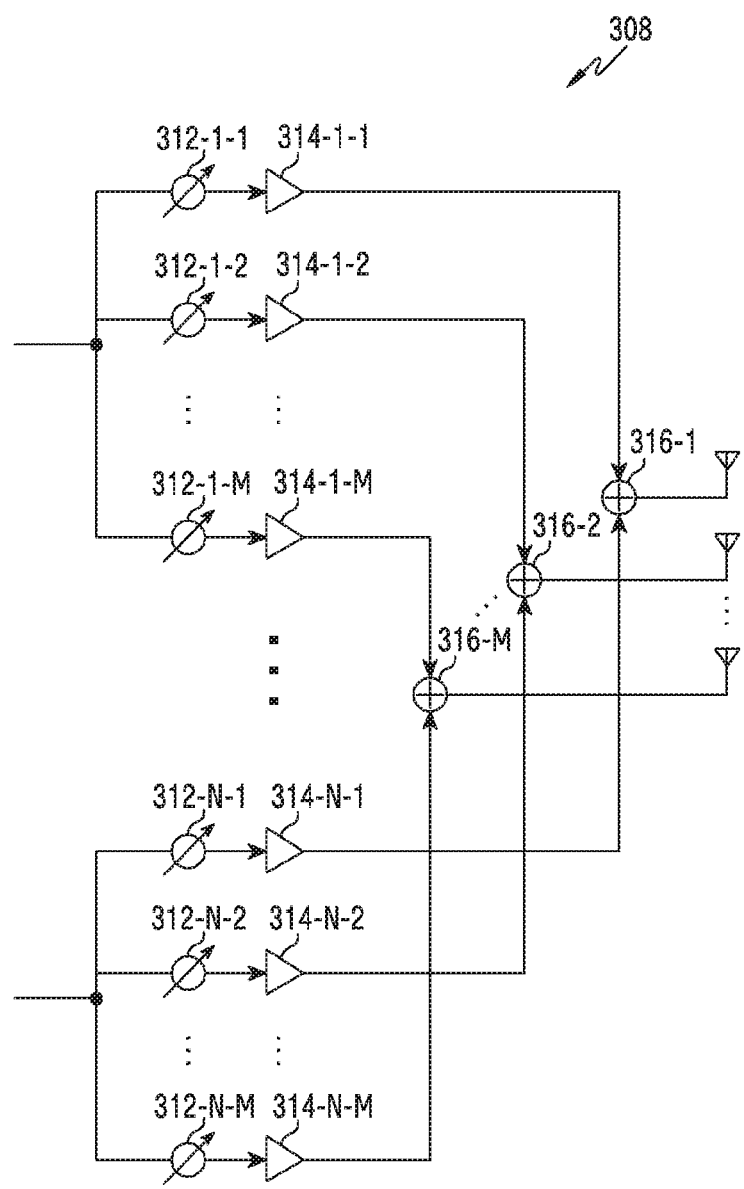

FIGS. 3A to 3C are diagrams illustrating the configuration of a communication unit in a wireless communication system according to various embodiments of the disclosure. FIGS. 3A to 3C illustrate examples of the detailed configuration of the communication unit 210 of FIG. 2. Particularly, FIGS. 3A to 3C illustrate components for performing beamforming, which are parts of the communication unit 210 of FIG. 2.

Referring to FIG. 3A, the communication unit 210 or a communication unit 310 may include an encoder and modulator 302, a digital beamforming unit 304, a plurality of transmission paths 306-1 to 306-N, and an analog beamforming unit 308.

The encoder and modulator 302 may perform channel encoding. To perform channel encoding, at least one of a low density parity check (LDPC) code, a convolution code, and a polar code may be used. The encoder and modulator 302 may perform constellation mapping, so as to generate modulated symbols.

The digital beamforming unit 304 may perform beamforming with respect to digital signals (e.g., modulated symbols). To this end, the digital beamforming unit 304 may multiply modulated symbols by beamforming weights. Here, the beamforming weights may be used for changing the size and the phase of signals, and may be referred to as a "precoding matrix", "precoder", and the like. The digital beamforming unit 304 may output digital-beamformed modulated symbols to the plurality of transmission paths 306-1 to 306-N. In this instance, according to a multiple input multiple output (MIMO) transmission scheme, the modulated symbols may be multiplexed or the modulated symbols may be provided to the plurality of transmission paths 306-1 to 306-N.

The plurality of transmission paths 306-1 to 306-N may change the digital-beamformed digital signals into analog signals. To this end, each of the plurality of transmission paths 306-1 to 306-N may include an inverse fast Fourier transform (IFFT) operation unit, a cyclic prefix (CP) insertion unit, a DAC, and an up-converter. The CP insertion unit is used for an orthogonal frequency division multiplexing (OFDM) scheme, and may be excluded if another physical layer scheme (e.g., a filter bank multi-carrier (FBMC)) is applied. That is, the plurality of transmission paths 306-1 to 306-N may provide independent signal processing processes with respect to a plurality of streams generated by digital beamforming. Depending on an implementation scheme, some of the components of the plurality of transmission paths 306-1 to 306-N may be used in common.

The analog beamforming unit 308 may perform beamforming with respect to analog signals. To this end, the digital beamforming unit 304 may multiply analog signals by beamforming weights. Here, the beamforming weights may be used for changing the size and phase of signals. Particularly, the analog beamforming unit 308 may be implemented as shown in FIG. 3B or 3C according to the connection structure of the plurality of transmission paths 306-1 to 306-N and antennas.

Referring to FIG. 3B, signals input to the analog beamforming unit 308 may pass through operations associated with changing of a phase/size, and amplification, and may be transmitted via antennas. In this instance, signals in respective paths may be transmitted via different antenna sets, that is, different antenna arrays. Referring to a signal processing associated with a signal input via a first path, the signal is converted into signal streams having different or the same phase/size by phase/size converters 312-1-1 to 312-1-M, and the signal streams are amplified by amplifiers 314-1-1 to 314-1-M and may be transmitted via antennas.

Referring to FIG. 3C, signals input to the analog beamforming unit 308 may pass through operations associated with changing of a phase/size, and amplification, and may be transmitted via antennas. In this instance, signals in respective paths may be transmitted via the same antenna set, that is, the same antenna array. Referring to a signal processing associated with a signal input via a first path, the signal is converted into signal streams having different or the same phase/size by the phase/size converters 312-1-1 to 312-1-M, and the signal streams are amplified by amplifiers 314-1-1 to 314-1-M. To enable the amplified signals to be transmitted via a single antenna array, the amplified signals may be added up based on an antenna element by add-up units 316-1-1 to 316-1-M, and may be transmitted via antennas.

FIG. 3B illustrates an example of using an independent antenna array for each transmission path, and FIG. 3C illustrates an example of sharing a single antenna array by transmission paths. However, according to another embodiment, some transmission paths use independent antenna arrays, and the other transmission paths may share a single antenna array. In addition, according to another embodiment, a switchable structure is applied to transmission paths and antenna arrays, and the structure may be adaptively changed according to a situation.

Figure 4:
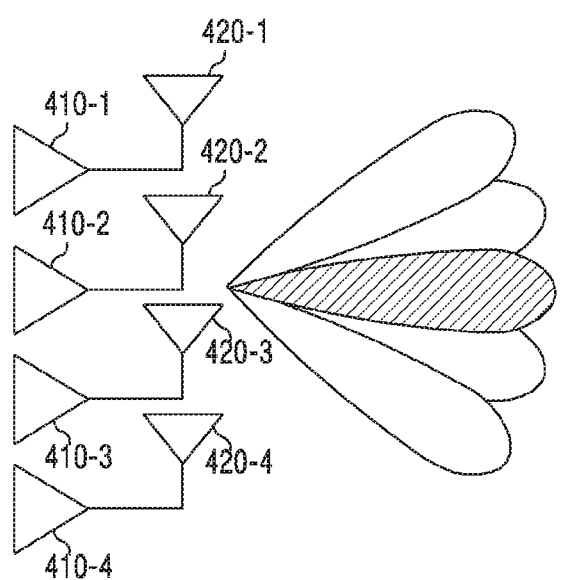
FIG. 4 is a diagram illustrating the configuration of an antenna and an antenna path in a wireless communication system according to various embodiments of the disclosure.

FIG. 4 is a diagram illustrating an example of the configuration of an antenna and an antenna path in a wireless communication system according to various embodiments of the disclosure. In the antennas and antenna paths illustrated in FIG. 4 may be understood as parts of the communication unit 210 of FIG. 2.

Referring to FIG. 4, a plurality of antenna elements 420-1 to 420-4, and amplifiers 410-1 to 410-4 are in an one-to-one correspondence. That is, antenna paths for respective antenna elements 420-1 to 420-4 may include the amplifiers 410-1 to 410-4, respectively. By using the plurality of antenna elements 420-1 to 420-4, beamforming with respect to a transmission signal may be performed. Via beamforming, an antenna gain may be increased.

In this instance, in order to reduce power consumption, a terminal may inactivate at least one of the plurality of antenna elements 420-1 to 420-4. For example, the terminal may turn off at least one of the amplifiers 410-1 to 410-4, or may change the state thereof to a stand-by state, so as to inactivate at least one of the plurality of antenna elements 420-1 to 420-4. Here, inactivation may include a change of the state of an amplifier, and a change of the state of at least one other component included in a transmission chain. Generally, the maximum value of an antenna gain by beamforming may be proportional to the number of antenna elements used. Therefore, if some antenna elements are inactivated, the antenna gain may vary. An example of a variation in antenna gain will be described with reference to FIGS. 5 and 6.

Figure 5:
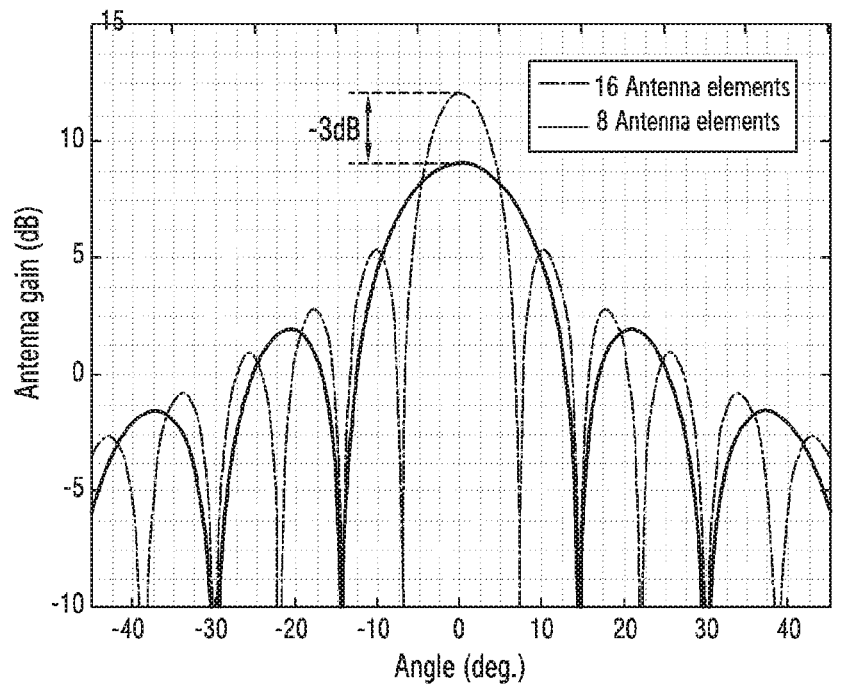
FIG. 5 is a diagram illustrating an example of a variation in antenna gain depending on the number of activated antenna elements in a wireless communication system according to various embodiments of the disclosure.
Figure 5:
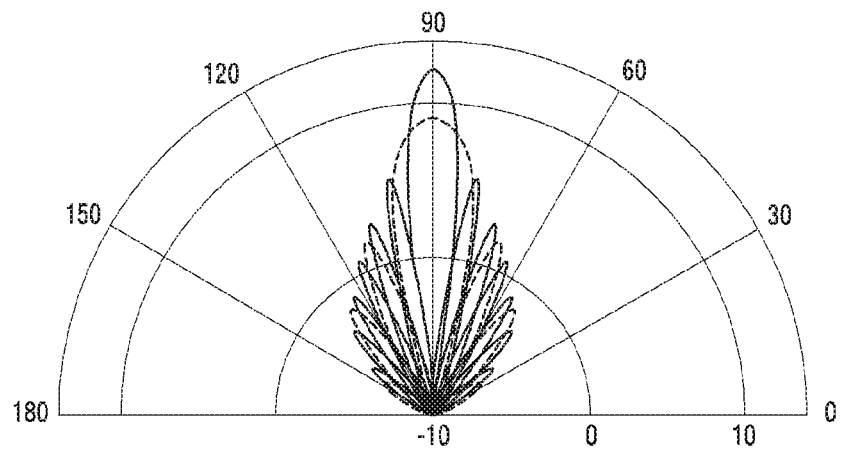

FIG. 5 is a diagram illustrating an example of a variation in antenna gain depending on the number of activated antenna elements in a wireless communication system according to various embodiments of the disclosure. Referring to FIG. 5, the maximum antenna gain may be measured at an angle of 0°. If 16 antenna elements are used, the maximum antenna gain is about 12 dB. If 8 antenna elements are used, the maximum antenna gain is about 9 dB. That is, if the number of activated antenna elements is decreased to half, the antenna gain decreases by 3 dB. Also, if the number of activated antenna elements is decreased to half, the power of a transmission signal is decreased to half. Accordingly, an equivalent isotropic radiated power (EIRP) may be decreased by 6 dB.

As illustrated in FIG. 5, if the direction of a transmission beam that a terminal uses is exactly aligned with the direction of a base station, in other words, if the base station is located in the direction corresponding to the angle of 0°, a variation in antenna gain depending on a change of the number of activated antenna elements may be predicted. However, exact alignment between the direction of the transmission beam used and the direction of the base station is not guaranteed. In this instance, a variation in antenna gain is as shown in FIG. 6.

Figure 6:
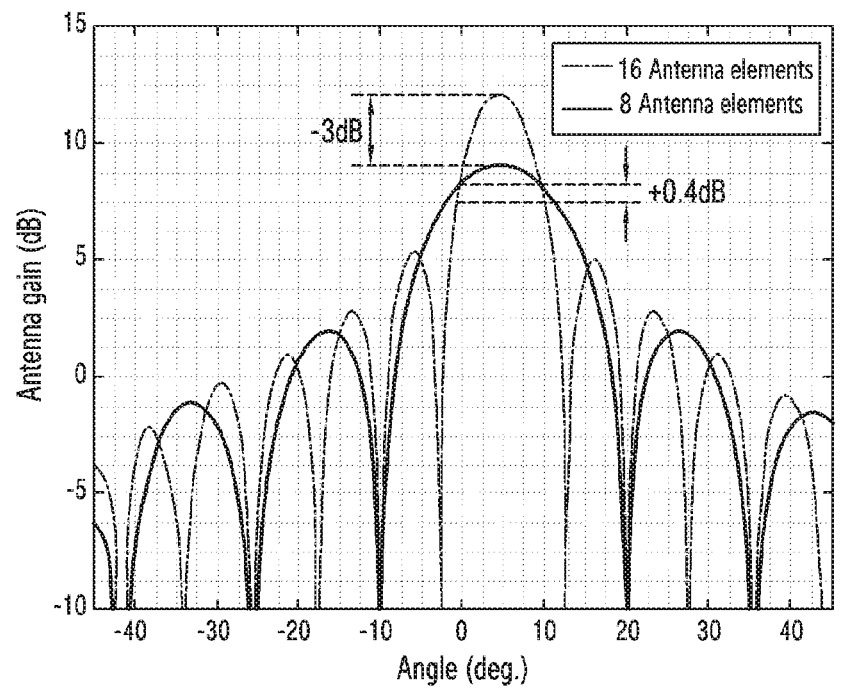
FIG. 6 is a diagram illustrating another example of a variation in antenna gain depending on the number of activated antenna elements in a wireless communication system according to various embodiments of the disclosure.
Figure 6:
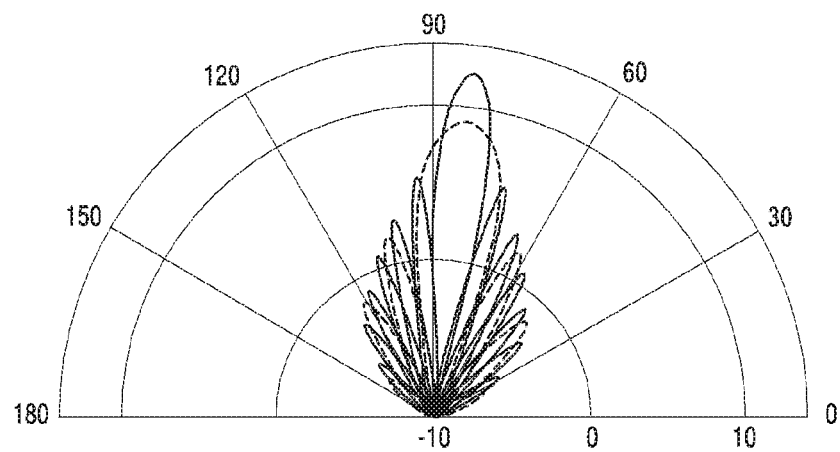

FIG. 6 is a diagram illustrating another example of a variation in antenna gain depending on the number of activated antenna elements in a wireless communication system according to various embodiments of the disclosure. FIG. 6 illustrates an example when the direction of the base station and the direction of the beam have a different of about 5°, that is, when a misalignment of about 5° exists therebetween. Referring to FIG. 6, if the number of activated antenna elements is changed from 16 to 8, the antenna gain at 0° may be decreased by 3 dB but the antenna gain in the direction in which the base station is located may be increased by 0.4 dB. Therefore, in a process of predicting a variation in gain, a gain error of 3.4 dB may be caused due to a misalignment.

As described above, if some antenna elements are inactivated, antenna gain varies. A variation in antenna gain may cause a variation in output power. Here, the output power is the final power of a signal emitted from a terminal, which is an index that takes into consideration of a signal gain, an amplifier output power, an antenna gain, and the like. Accordingly, if the number of activated antenna elements varies, an unexpected change in output power may occur. If a system has a constraint on a variation in output power, a situation that violates the constraint may occur unexpectedly, due to a change in the number of activated antenna elements. For example, when the number of activated antenna elements is changed, an output power may exceed a relative power tolerance. Therefore, there is a desire for compensation associated with output power in consideration of a variation in antenna gain depending on a change in the number of activated antenna elements.

In order to perform compensation associated with the output power, a variation in antenna gain needs to be estimated. As described with reference to FIGS. 5 and 6, a variation in antenna gain which is associated with inactivation of some antenna elements may be different based on a degree of a misalignment with a beam direction. Therefore, when estimating a variation in antenna gain, a degree of a misalignment with a beam direction may be taken into consideration.

According to an embodiment, a terminal may estimate a variation in antenna gain, based on the reciprocity of the antenna gain. That is, the terminal may estimate a variation in antenna gain using a downlink signal by assuming that an antenna gain in uplink communication and an antenna gain in downlink communication are the same. An embodiment of estimating a variation in antenna gain will be described with reference to FIG. 7.

Figure 7:
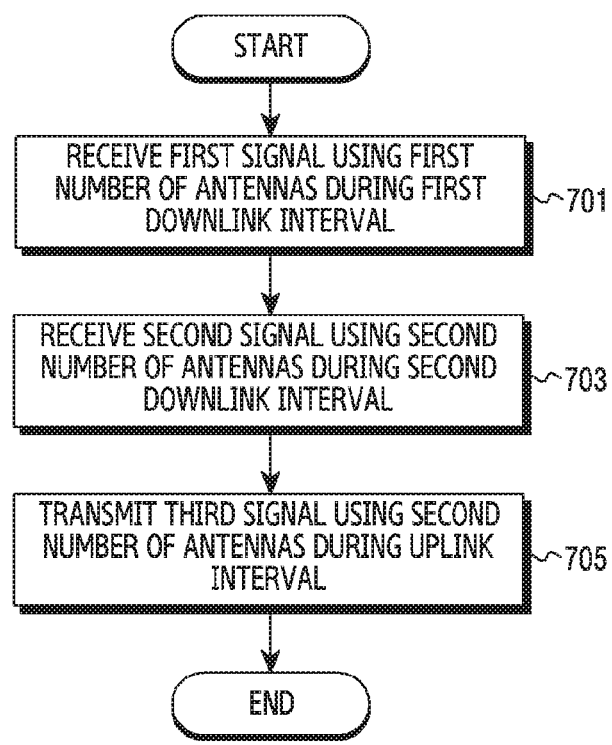
FIG. 7 is a flowchart illustrating operation by a terminal in a wireless communication system according to various embodiments of the disclosure.

FIG. 7 is a flowchart illustrating operation by a terminal in a wireless communication system according to various embodiments of the disclosure. FIG. 7 illustrates the operation method of the terminal 120.

Referring to FIG. 7, in operation 701, the terminal receives a first signal using a first number of antennas during a first downlink interval. That is, the terminal may perform reception beamforming using the first number of antenna elements. Here, the first signal may include at least one of a data signal, a reference signal, and a control signal. In this instance, the terminal may measure at least one of a reception signal strength (e.g., reference signal received power (RSRP), a received signal strength indicator (RSSI), and the like), a reception signal gain, and a reception antenna gain when the first number of antenna elements are used.

In operation 703, the terminal receives a second signal using a second number of antennas during a second downlink interval. That is, the terminal may perform reception beamforming using the second number of antenna elements. Here, the second signal may include at least one of a data signal, a reference signal, and a control signal. In this instance, the terminal may measure at least one of a reception signal strength (e.g., an RSRP, an RSSI, and the like), a reception signal gain, and a reception antenna gain when the second number of antenna elements are used.

In operation 705, the terminal may transmit a third signal using the second number of antennas during an uplink interval. Although not illustrated in FIG. 7, in a previous uplink transmission, the terminal transmits an uplink signal using the first number of antennas, and transmits a second signal, which is another uplink signal, using the second number of antennas. In this instance, in order to perform compensation associated with a gain based on a change in the number of antennas, the terminal may consider the difference between a value measured in operation 701 and a value measured in operation 703 to be a variation in antenna gain caused by the change of the number of antennas. That is, the terminal may measure a variation in antenna gain based on gains of the first signal and the second signal, and may perform compensation associated with output power based on the measured variation in antenna gain.

According to an embodiment, which has been described with reference to FIG. 7, the terminal may estimate a variation in antenna gain caused by a change of the number of antennas, using downlink signals, and may perform compensation associated with output power. In the procedure of FIG. 7, according to another embodiment, the order of operations 701 and 705 may be changed with each other. An example of timings of estimating a variation in antenna gain and performing compensation associated with output power will be described with reference to FIG. 8.

Figure 8:
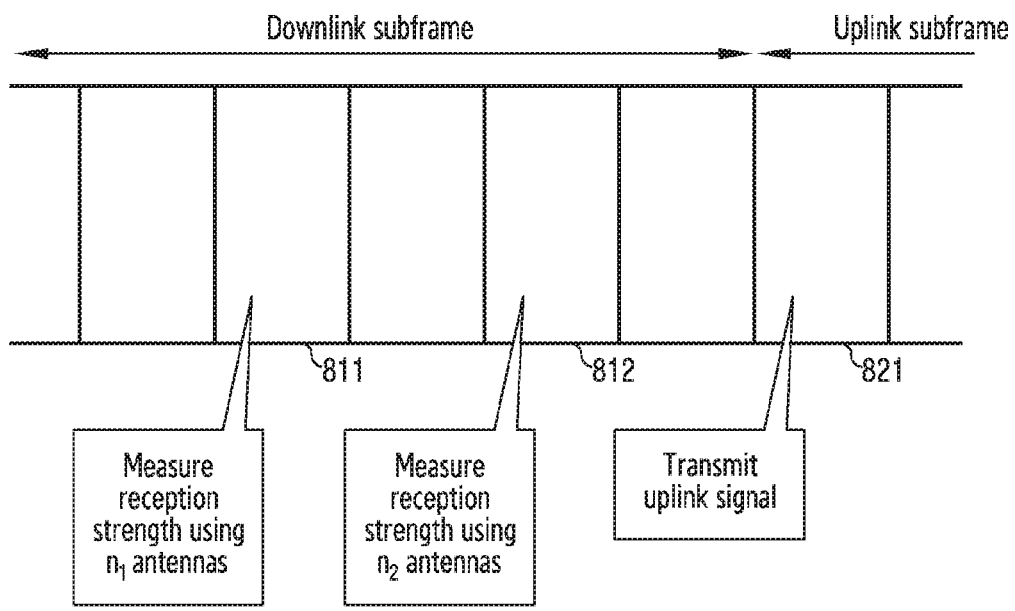
FIG. 8 is a diagram illustrating an example of a timing of estimating a variation in antenna gain in a wireless communication system according to various embodiments of the disclosure.

FIG. 8 is a diagram illustrating an example of a timing of estimating a variation in antenna gain in a wireless communication system according to various embodiments. Referring to FIG. 8, in a downlink subframe 811, a terminal measures a reception strength using $n_1$ antennas. In a downlink subframe 812, the terminal measures a reception strength using $n_2$ antennas. If the same channel gain and the same transmission antenna gain are used in the subframes 811 and 812, the difference between two reception strengths may indicate a reception antenna gain. Therefore, the terminal may estimate the difference between the two reception strengths to be a reception antenna gain. Subsequently, in an uplink subframe 821, the terminal may perform compensation associated with output power, based on the estimated reception antenna gain, and may transmit an uplink signal.

According to embodiments as described above, a variation in antenna gain caused by inactivation of some of the transmission antennas may be estimated. Accordingly, the output power may be compensated by a value corresponding to the variation in antenna gain. In this instance, the compensation associated with the output power may be performed in various manners. According to an embodiment, the output power may be compensated by changing transmission power. In order to change the transmission power, at least one of the various factors (e.g., a resource block offset, a bandwidth of an allocated resource, a path loss, and the like) used for determining transmission power may be controlled. Hereinafter, an embodiment of performing compensation associated with output power by controlling transmission power will be described with reference to FIG. 9.

Figure 9:
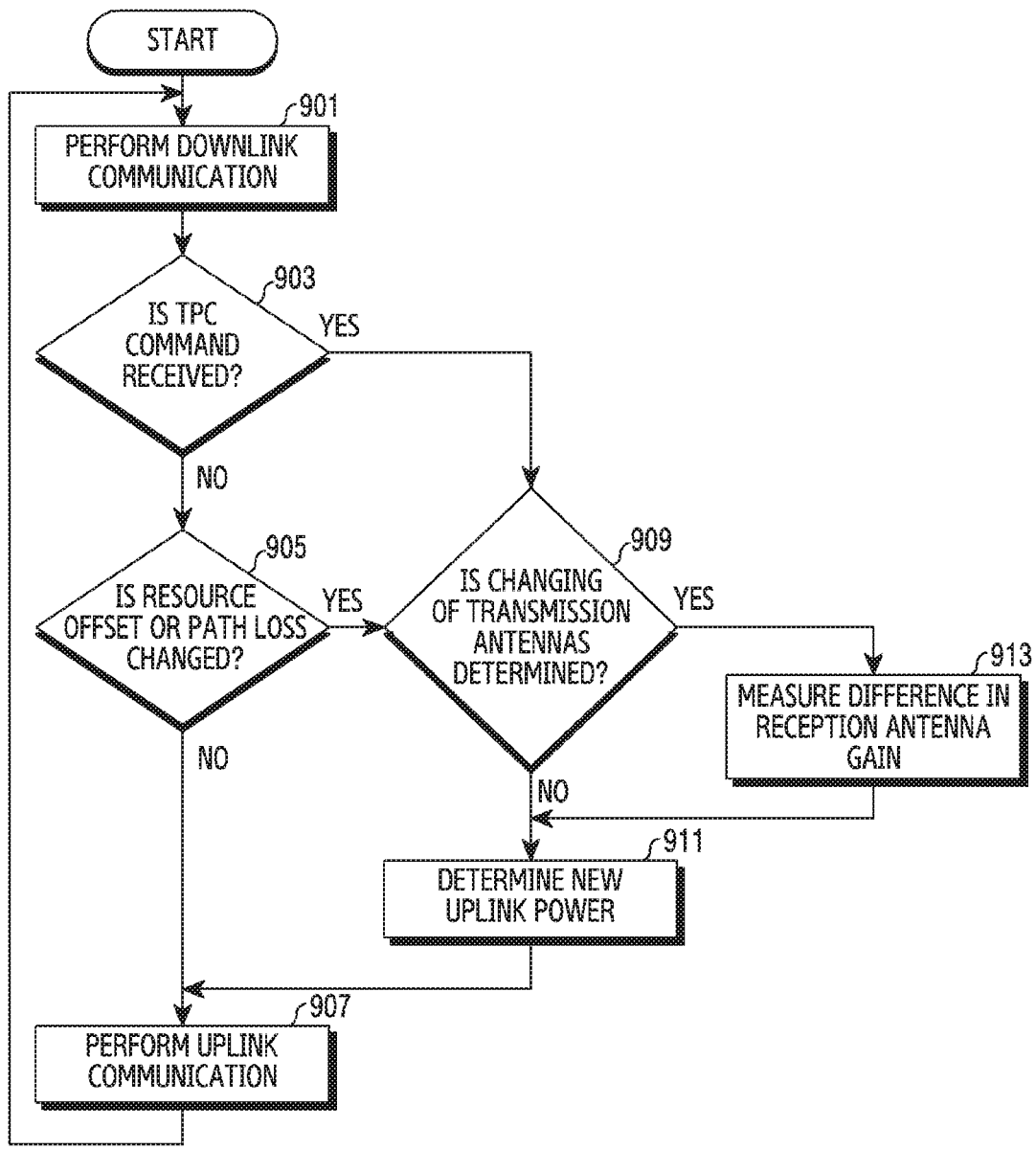
FIG. 9 is a flowchart illustrating a process of controlling, by a terminal, uplink power in response to reception of a transmission power control (TPC) command in a wireless communication system according to various embodiments.

FIG. 9 is a flowchart illustrating a process of controlling, by a terminal, uplink power in response to reception of a transmission power control (TPC) command in a wireless communication system according to various embodiments of the disclosure. FIG. 9 illustrates the operation method of the terminal 120.

Referring to FIG. 9, in operation 901, the terminal performs downlink communication. The terminal may receive at least one of a reference signal, a data signal, and a control signal via a downlink subframe.

In operation 903, the terminal may identify whether a TPC command is received. The TPC command is control information for controlling uplink power. The TPC command may explicitly indicate a variation in power, or may indicate increasing/decreasing of power by a predetermined value. Upon reception of the TPC command, the terminal may proceed with operation 909 and subsequent operations.

If the TPC command is not received, the terminal may identify whether a resource offset or a path loss is changed in operation 905. Here, the resource offset and the path loss are factors that determine transmission power. The terminal may determine whether a resource offset is changed, based on resource allocation information. Also, the terminal may estimate a path loss using a reference signal. If the resource offset or path loss is changed, the terminal may proceed with operation 909.

If the resource offset or path loss is not changed, the terminal may perform uplink communication in operation 907. That is, the terminal may transmit an uplink signal using a previously used transmission power, without changing the transmission power.

In operation 909, the terminal may determine whether to change the number of transmission antennas. If the TPC command is received, or the resource offset or path loss is changed, in other words, if the transmission power needs to be redetermined, the terminal may determine whether to change the number of transmission antennas used for transmitting an uplink signal.

If it is determined not to change the number of transmission antennas, the terminal may determine new uplink power in operation 911. In this instance, the terminal may determine new uplink power based on the TPC command, the changed resource offset or changed path loss.

If it is determined to change the number of transmission antennas, the terminal may measure the difference in reception antenna gain in operation 913. In other words, the terminal may estimate a variation in antenna gain when the number of transmission antennas is changed. To this end, the terminal may receive a first downlink signal using a first number of reception antennas, may receive a second downlink signal using a second number of reception antennas, and may calculate the difference in reception strength between the first downlink signal and the second downlink signal.

After measuring the difference in reception antenna gain, the terminal may determine new uplink power in operation 911. In this instance, the terminal may apply the estimated variation in antenna gain to one of the factors for determining transmission power. For example, the terminal may apply the variation in antenna gain to the value of a path loss. That is, the terminal may use a path loss which is different from the measured path loss.

According to embodiments which have been described with reference to FIG. 9, the number of activated antennas may be changed at the point in time at which transmission power is changed. However, according to another embodiment, irrespective of whether the transmission power needs to be changed, the terminal may control the number of activated antennas.

Figure 10:
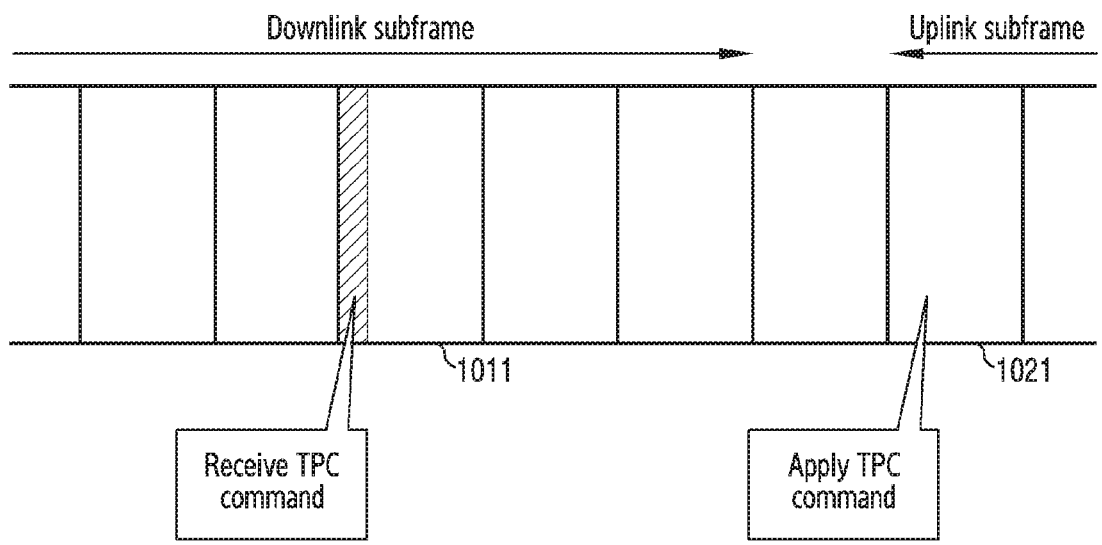
FIG. 10 is a diagram illustrating an example of timings of receiving and applying a TPC command in a wireless communication system according to various embodiments of the disclosure.

According to the embodiment illustrated in FIG. 9, after the TPC command is received, and before an uplink signal is transmitted, the difference in reception antenna gain may be measured. Generally, the TPC command may be received about 4 or 7 subframes before the point in time at which the transmission power is actually changed. For example, as illustrated in FIG. 10, 4 subframes after the event in which the TPC command is received in a downlink subframe, the TPC command may be applied in an uplink subframe. In this instance, the amount of time given for estimating a variation in antenna gain caused by the change of the number of antennas may be insufficient. Therefore, according to an embodiment, the terminal may predict a change in the number of antennas in advance, and may estimate a variation in antenna gain in advance. An embodiment related to estimating a variation in antenna gain based on the prediction will be described with reference to FIG. 11.

Figure 11:
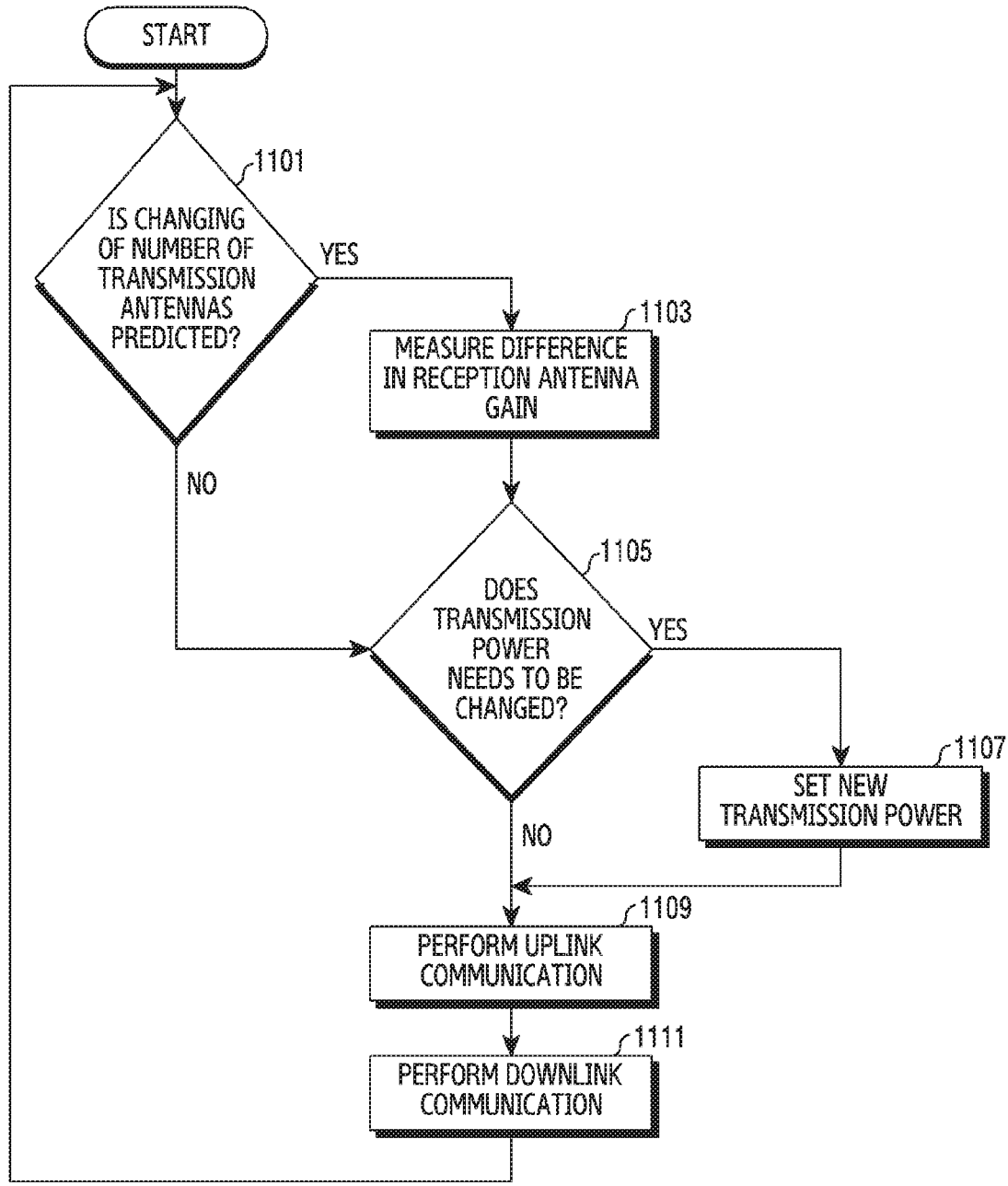
FIG. 11 is a flowchart illustrating a process of controlling, by a terminal, uplink power, based on prediction of a change in the number of activated antennas in a wireless communication system according to various embodiments.

FIG. 11 is a flowchart illustrating a process of controlling, by a terminal, uplink power, based on prediction of a change in the number of activated antennas in a wireless communication system according to various embodiments. FIG. 11 illustrates the operation method of the terminal 120.

In operation 1101, the terminal may determine whether a change in the number of transmission antennas is predicted. The change in the antenna numbers may be predicted based on the current gain value. For example, in the case in which available gain values are in the range of 0 dB to 12 dB, if half of the antennas are inactivated, 7 dB or 6 dB may be a gain point at which a change in the number of antennas is predicted. In addition, if the TPC command is in the range of +3 dB to −1 dB, a decrease in the number of antennas may be predicted when the current gain is 7 dB. Alternatively, an increase in the number of antennas may be predicted when the current gain is in the range of 6 to 4 dB. That is, the terminal may determine whether the number of transmission antennas is changeable by taking into consideration the current transmission power value, and the magnitude of transmission power that needs to be increased or decreased based on the change in the number of antennas.

In operation 1103, the terminal may measure the difference in reception antenna gain. In other words, the terminal may estimate a variation in antenna gain when the number of transmission antennas is changed. To this end, the terminal may receive a first downlink signal using a first number of reception antennas, may receive a second downlink signal using a second number of reception antennas, and may calculate the difference in reception strength between the first downlink signal and the second downlink signal.

In operation 1105, the terminal may determine whether transmission power needs to be changed. In other words, the terminal may identify whether the TPC command is received, or whether at least one factor (e.g., a path loss, a resource offset, or the like) that affects the transmission power is changed.

If the transmission power needs to be changed, the terminal may determine a new uplink transmission in operation 1107. In this instance, the terminal may apply the estimated variation in antenna gain to one of the factors for determining transmission power. For example, the terminal may apply the variation in antenna gain to the value of a path loss. That is, the terminal may use a pass loss which is different from the measured path loss.

In operation 1109, the terminal may perform uplink communication. That is, the terminal may transmit an uplink signal using the new transmission power. In operation 1111, the terminal may perform downlink communication.

As described above, the terminal may estimate a variation in antenna gain when the number of transmission antennas is changed, using downlink signals. In this instance, if a resource allocated to the terminal does not exist in a downlink frame, a data signal transmitted to the terminal may not exist. In this instance, the terminal may estimate a variation in antenna gain using a control signal (e.g., a physical downlink control channel (PDCCH)). An embodiment that uses a control signal will be described with reference to FIG. 12.

Figure 12:
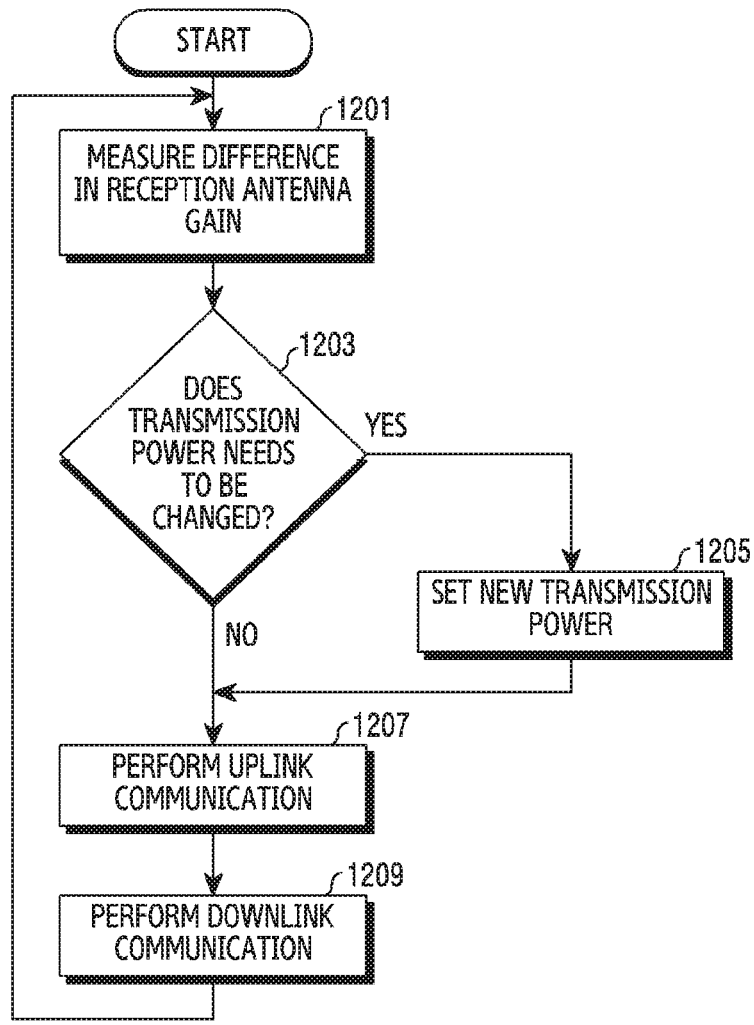
FIG. 12 is a flowchart illustrating a process of performing, by a terminal, compensation associated with uplink transmission power using a control signal in a wireless communication system according to various embodiments of the disclosure.

FIG. 12 is a flowchart illustrating a process of performing, by a terminal, compensation associated with uplink transmission power using a control signal in a wireless communication system according to various embodiments of the disclosure. FIG. 12 illustrates the operation method of the terminal 120.

Referring to FIG. 12, in operation 1201, the terminal measures the difference in reception antenna gain using a control signal. In other words, the terminal may estimate a variation in antenna gain when the number of transmission antennas is changed. To this end, the terminal may receive a first control signal using a first number of reception antennas, may receive a second control signal using a second number of reception antennas, and may calculate the difference in reception strength between the first control signal and the second control signal. In this instance, the first control signal and the second control signal may be signals that include or exclude control information for the terminal.

In operation 1203, the terminal may determine whether transmission power needs to be changed. In other words, the terminal may identify whether the TPC command is received, or whether at least one factor (e.g., a path loss, a resource offset, or the like) that affects transmission power is changed.

If the transmission power needs to be changed, the terminal may determine a new uplink transmission in operation 1205. In this instance, the terminal may apply the estimated variation in antenna gain to one of the factors for determining transmission power. For example, the terminal may apply the variation in antenna gain to the value of a path loss. That is, the terminal may use a pass loss which is different from the measured path loss.

In operation 1207, the terminal may perform uplink communication. That is, the terminal may transmit an uplink signal using the new transmission power. In operation 1209, the terminal may perform downlink communication.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
   receiving a first signal using a first number of one or more antennas during a first downlink interval;
   receiving a second signal using a second number of one or more antennas during a second downlink interval, wherein the second number is different from the first number;
   obtaining a reception gain variation from a first antenna gain of the received first signal to a second antenna gain of the received second signal; and
   transmitting a third signal using the second number of antennas during an uplink interval, at an output power which is compensated based on the reception gain variation.

2. The method as claimed in claim 1, further comprising:
   estimating a variation in transmission antenna gain when a number of transmission antennas is changed from the first number to the second number, using the reception gain variation.

3. The method as claimed in claim 2, wherein the output power is compensated by adjusting a transmission power of the third signal, based on the variation in transmission antenna gain.

4. The method as claimed in claim 2, wherein the estimating the variation in antenna gain comprises:
   estimating the variation in transmission antenna gain in response to reception of a transmission power control (TPC) command from a base station, in response to a change of a path loss or a resource offset, or in response to prediction of a change of the number of antennas.

5. The method as claimed in claim 1, wherein the first signal and the second signal comprise at least one of a reference signal, a data signal, or a control signal.

6. A terminal apparatus in a wireless communication system, the apparatus comprising:
   a transceiver configured to transmit and receive a signal;
   at least one processor configured to control the transceiver so as to:
      receive a first signal using a first number of one or more antennas during a first downlink interval;
      receive a second signal using a second number of one or more antennas during a second downlink interval, wherein the second number is different from the first number;
      obtain a reception gain variation between a first antenna gain of the received first signal and a second antenna gain of the received second signal; and
      transmit a third signal using the second number of antennas during an uplink interval, at an output power compensated based on the reception gain variation.

7. The apparatus as claimed in claim 6, wherein the at least one processor is configured to estimate, using the reception gain variation, a variation in transmission antenna gain when a number of antennas is changed from the first number to the second number.

8. The apparatus as claimed in claim 7, wherein the output power is compensated by adjusting a transmission power of the third signal, based on the variation in transmission antenna gain.

9. The apparatus as claimed in claim 7, wherein the at least one processor is configured to estimate the variation in transmission antenna gain in response to reception of a transmission power control (TPC) command from a base station.

10. The apparatus as claimed in claim 7, wherein the at least one processor is configured to estimate the variation in transmission antenna gain in response to a change of a path loss or a resource offset.

11. The apparatus as claimed in claim 7, wherein the at least one processor is configured to estimate the variation in transmission antenna gain in response to prediction of a change of the number of antennas.

12. The apparatus as claimed in claim 6, wherein the first signal and the second signal comprise at least one of a reference signal, a data signal, or a control signal.

* * * * *